P. BERNARD.
RAIN WATER FILTER.
APPLICATION FILED APR. 8, 1916.
1,211,052.
Patented Jan. 2, 1917.
2 SHEETS—SHEET 1.
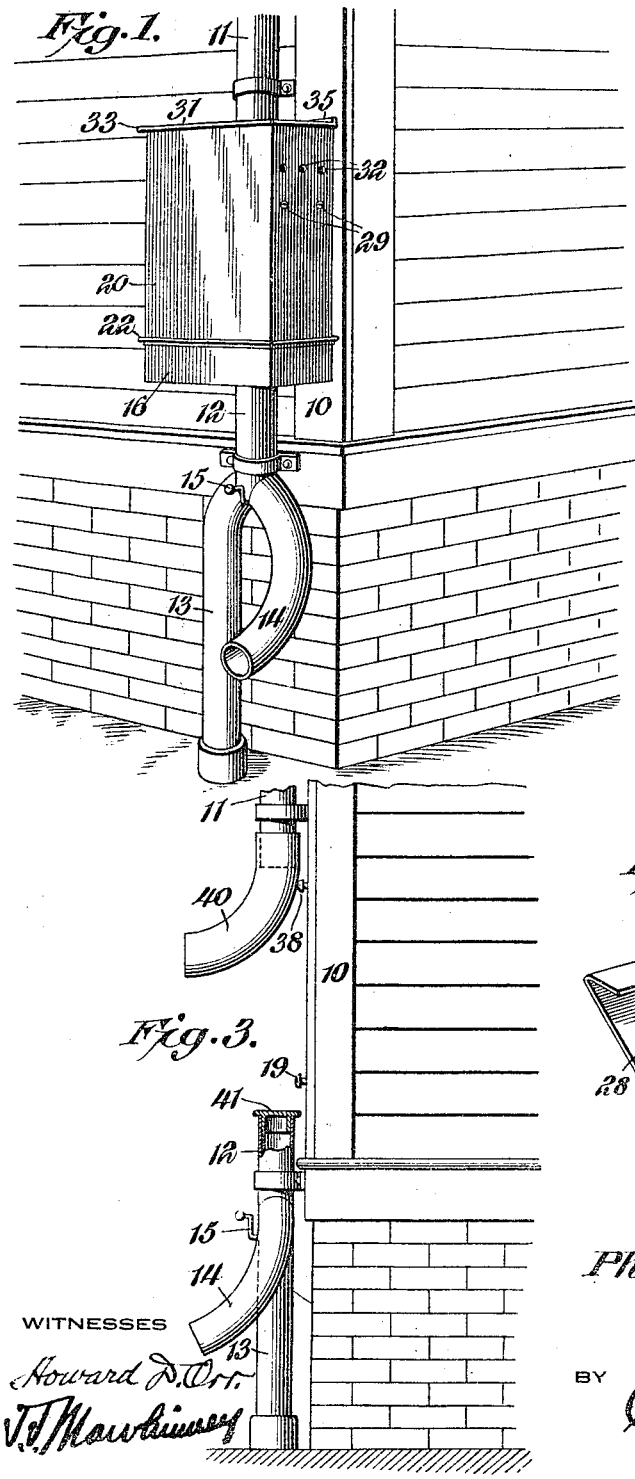
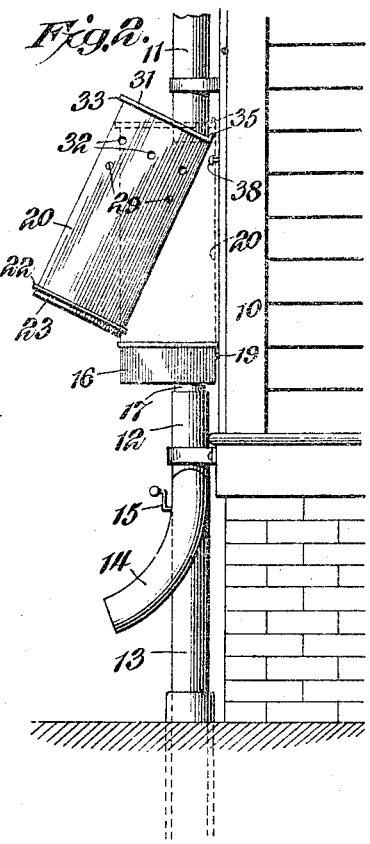
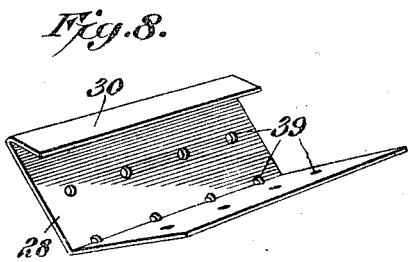
Philip Bernard,
INVENTOR,
WITNESSES
BY
ATTORNEY P. BERNARD.
RAIN WATER FILTER.
APPLICATION FILED APR. 8, 1916.
1,211,052.
Patented Jan. 2, 1917.
2 SHEETS—SHEET 2.
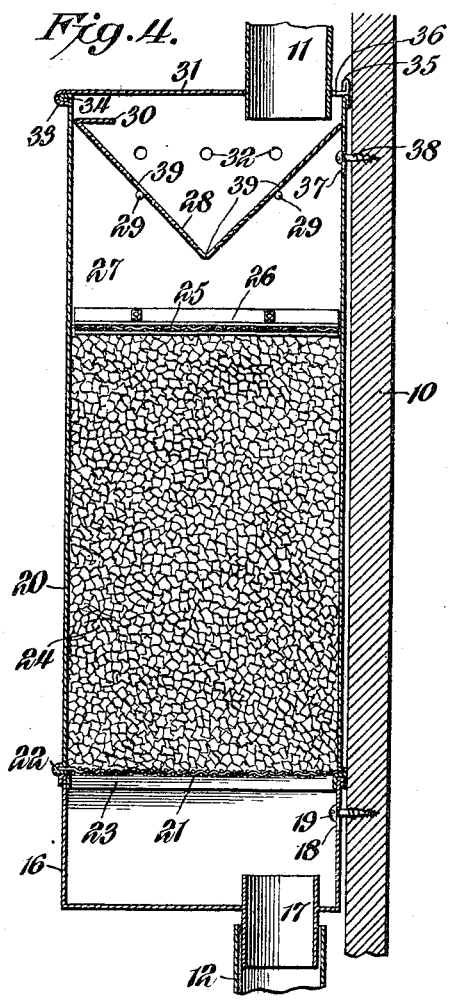
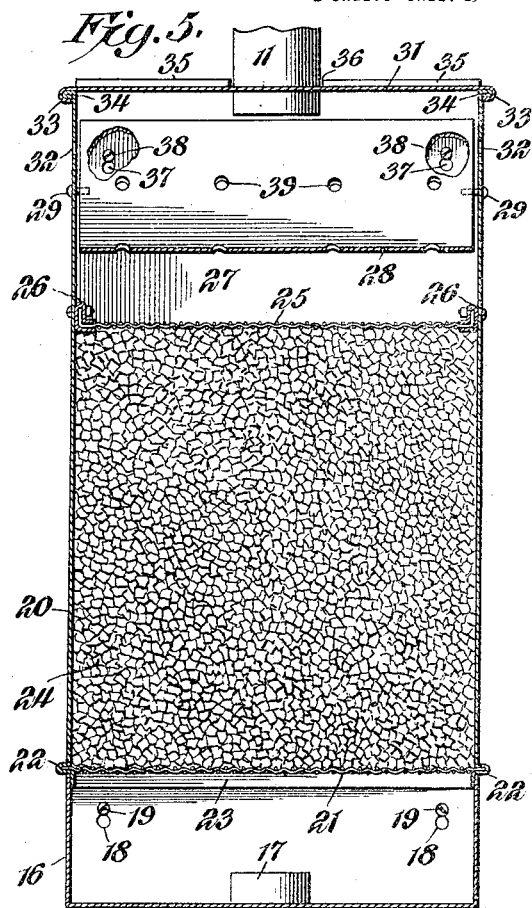
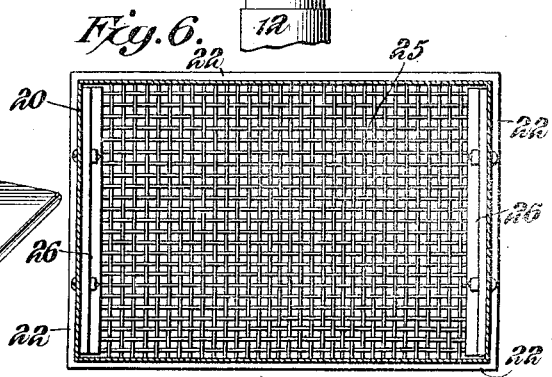
WITNESSES
Howard D. Orr
T. J. Mawhinney
Philip Bernard, INVENTOR,
BY E. G. Siggers
ATTORNEY

UNITED STATES PATENT OFFICE.

PHILIP BERNARD, OF SIOUX CITY, IOWA.

RAIN-WATER FILTER.

1,211,052.   Specification of Letters Patent.   Patented Jan. 2, 1917.

Application filed April 8, 1916. Serial No. 89,851.

*To all whom it may concern:*

Be it known that I, PHILIP BERNARD, a citizen of the United States, residing at Sioux City, in the county of Woodbury and State of Iowa, have invented a new and useful Rain-Water Filter, of which the following is a specification.

The present invention relates to an improved rain-water filter of the type adapted to be mounted in a rain spout.

An object of this invention is to provide a filter of this character which may be easily and quickly secured to and removed from the rain spout which extends down against the side of the wall, so that the filter may be stored away inside the house during the winter when not in use, to protect the filter from the severe weather and prevent its possible bursting by accumulations of ice therein; and to provide a device which is of such peculiar construction, and which is so mounted against the wall that it may be fitted to and detached from the rain spout and the wall simply by the act of assembling and separating the sections of the filter, and without the tightening or loosening of screws, bolts, nails, clamps, or other attaching devices.

Another object of the invention is to provide a filter which throws off from the spout all excess water, or all water over the amount which can properly permeate through the filter and be cleansed as desired. Thus, rain-water which cannot be properly filtered is prevented from passing farther down the spout and into the cistern, or the storage receptacle; and to provide the filter with a detachable water spreading and refuse collecting plate to distribute the water over substantially the entire surface area of the filtering element, and to also serve as a collector for leaves, and other foreign matter which accumulate from the eaves-trough.

Other objects and advantages of the invention will appear from the following specific disclosure of the present preferred embodiment, the same being illustrated in the accompanying drawings, wherein—

Figure 1 is a perspective view of a rain-water filter constructed according to this invention, mounted in a rain spout and against the side of a wall. Fig. 2 is a side elevation of the same, the full lines showing the upper section lifted out of the lower section and inclined outwardly at its lower end, in the act of removing or positioning the upper section, the dotted lines showing the upper section in place. Fig. 3 is a similar view, showing the cap and elbow used on the spout when the filter is removed. Fig. 4 is a vertical, central, sectional, enlarged view, taken through the filter from front to back, or through its narrower dimension, and showing the same secured against the wall and fitting upon the upper and lower spout sections. Fig. 5 is a vertical enlarged sectional view of the filter in position, taken at right angles to the showing in Fig. 4, or from side to side of the filter through its larger dimension. Fig. 6 is a horizontal sectional view, taken through the upper end of the body of the filter, and showing the upper screen or partition. Fig. 7 is a detail perspective view of the cover or top which is detachably mounted on the body of the filter. Fig. 8 is a detail perspective view of the combined water spreading and refuse collecting plate, which is detachably mounted in the top of the body section.

Referring to these drawings, wherein like parts are designated by similar numerals of reference throughout the several views, 10 designates a wall of a house, or the like, which is provided in the usual manner with a rain spout 11, extending downwardly against the wall from the roof. According to the present invention, the spout 11 terminates at a substantial distance above the ground, as shown in the drawings, and registers vertically over a lower spout section 12, which is branched to provide a conducting pipe 13 leading to a cistern, or any other suitable device for holding the filtered rain-water until used. The opposite branch 14 constitutes a discharge branch which directs the downpouring rain-water away from the wall. A valve may be employed in the lower section 12 of the spout to control the flow of the rain-water through the branches 13 and 14, and may be operated by a handle 15.

A lower or base section 16 is provided, which is in the form of a preferably rectangular relatively deep pan or basin provided with a vertically positioned nipple 17 of a size to freely fit into the upper open end of the spout section 12. The rear wall of the base section 16 is provided, near its opposite ends, with slots 18 of such form as to present an enlarged lower end and a relatively small upper end. Headed projections 19, shown in the present instance as in the form of screws, are secured in the wall 10 in registry with the slots 18, and are so positioned as to project the heads thereof sufficiently outward to engage through the slots 18, and bind against the inner face of the rear of the section 16.

When the base section 16 is adjusted into position to bring the nipple 17 over the spout section 12, the heads of the projections 19 pass through the lower enlarged ends of the slots 18. As the base section 16 is moved downwardly against the lower section 12 of the rain spout, the projections 19 engage in the upper reduced ends of the slots to securely hold the base section 16 from falling forwardly from the wall 10, and to maintain the base section 16 in proper registry over the lower spout section 12.

The upper or body section 20 of the filter is preferably of the same cross sectional configuration as that of the base section 16. The section 20 has a perforated bottom 21, shown in the present instance as in the form of a wire mesh screen secured at its marginal edges in an annular outwardly pressed bead 22 at the base of the upper section 20. This bead 22 also provides a supporting shoulder which seats upon the upper edge of the base section 16. An annular flange 23 depends from the bead 22, and is offset inwardly from the walls of the sections 16 and 20 so as to project into the upper open end of the base section 16 sufficiently to hold the two sections together and prevent their accidental relative lateral displacement.

A filtering element 24, disclosed in the present instance as of granulated charcoal, is placed in the body section 20. The charcoal rests upon the wire mesh bottom 21, and is held in place thereon by means of a perforated partition or plate 25, shown as composed of a wire mesh screen placed in the upper end of the body section 20. This partition 25 is held in place by means of metal strips 26. The strips are overturned laterally to bring their longitudinal edges together, and receive therebetween the opposite ends of the partition 25. The strips are then bent at right angles to secure the ends of the partition 25 therein. The strips 26 are finally secured against the opposite end walls of the section 20 by bolts, or the like, to stretch the partition 25 over the charcoal.

A chamber 27 is provided in the upper end of the section 20 above the partition 25. Within the chamber is fitted a spreading plate 28. The plate 28 is bent intermediate its longitudinal edges, and is substantially V-shaped in cross section, as shown to advantage in Figs. 4 and 8. The plate 28 is of a size sufficient to extend entirely over the filtering element 24, and has its opposite longitudinal edges resting against the front and rear walls of the body section 20. Pins 29 project inwardly from the side walls of the body section, and are spaced sufficiently above the partition 25 to engage the opposite sides or wings of the plate 28 and hold the plate 28 in spaced relation above the partition 25.

A deflecting flange 30 is turned inwardly and substantially horizontally from the front edge of the spreading plate 28, as shown in Fig. 4, so as to prevent the flashing of the downpouring rain-water up against the cover 31 and out over the sides of the body section.

The body section 20 is also provided, near the top of the chamber 27, with a number of outlet openings 32 located above the spreading plate 28, and adapted to permit the outflow of water, when the same accumulates in the chamber 27 of the height of the openings 32. These openings 32 prevent an undue accumulation and pressure of water in the top of the body 20, so that the water therein may pass down through the filtering element 24 in a natural manner and be properly cleansed.

The cover 31, as shown to advantage in Fig. 7, preferably comprises a flat plate provided upon its lateral and front edges with downwardly extending and inturned flanges 33 for engagement with the corresponding outturned flanges 34 formed on the top of the body section 20. The back edge of the cover 31 is turned upwardly and rolled over to provide a reinforcing flange 35, extending across the back. A slot or opening 36 is formed in the rear edge of the cover 31 and extends forwardly through the reinforcing flange 35, as shown. The inner end of the opening 36 is rounded to conform to the contour of the lower end of the spout 11, so as to snugly receive the same. The lower end of the spout section 11 is adapted to extend down through this slot 36, and terminate in a position in spaced relation above the spreader plate 28, so as to admit of the upward movement of the body section 20 a distance sufficient to entirely clear the marginal flange 23 from the upper edge of the base section 16. This body section 20 has in its rear wall, an upwardly tapering slot 37, which is preferably of the same tapering formation as the lower slot 18. A second headed projection 38 is secured in the wall 10 a short distance below the upper spout section 11 and in registry with the upper slot 37. As shown in the drawings, there are two of these slots 37, and a corresponding pair of headed projections 38. These projections 38 hold the body section 20 rigidly against the wall 10 and in alinement with the base section 16 and the upper spout section 11.

The spreader plate 28 is provided with a plurality of openings 39 therethrough which may be arranged in any desired manner. In the present instance, the same are disclosed in the arrangement of three rows, one row arranged along the bent intermediate portion of the plate, while the lateral rows are arranged substantially intermediate the edges of the wings or sides of the plate. This provides for the delivery of the rain-water in a number of separate streams of a predetermined size, depending upon the diameter of the openings 39, and in such spaced apart relation that the water is dropped upon the filtering element 24 without any great force. This allows the water to percolate through the mass of charcoal by gravity and not by force, so that the water is thoroughly cleansed and purified when it drops into the basin or lower section 16.

In use, when the device is to be applied, the base section 16 is first placed over the lower section 12 of the spout with its rear wall against the wall 10, and its nipple 17 directly over the spout section 12. The base 16 is now forced downwardly to engage the nipple 17 in the spout section and also to move the slotted portions of the base section downwardly about the headed projections 19, and thus bind the base section to the heads. This holds the base section rigidly in place. The body section 20 is now inclined inwardly toward the wall 10, as shown in Fig. 2, to bring the slot 36 beneath the upper spout section 11. The body section is moved upwardly about the spout section 11 sufficiently to clear the flange 23 from the base section, when the lower end of the body 20 is swung inwardly against the wall and is then slid downwardly to seat the flange 23 in the top of the base section. As soon as the body 20 is swung flat against the wall 10, the slots 37 receive the headed projections 38 therein, and as the body is moved downwardly, the slotted portions thereof are carried downwardly, so as to bind against the heads of the projections and thus securely hold the body section to the wall and beneath the spout.

Rain-water pouring down the spout 11 strikes the inner wing of the plate 28 and is deflected downwardly and forwardly. The deflecting flange 30 at the forward edge of the spreader deflects the flashing water back into the spreader plate and prevents it from striking with force against the cover 31 and thus working over the edges of the body 20 and outwardly therefrom. Should the quantity of water be excessive and thus tend to force the underlying water too rapidly through the filtering element 24, the excess water flows out of the openings 32, and is thus carried off from the interior of the filter. This unfiltered water, therefore, cannot possibly enter the lower section 12 of the rain spout.

To remove the filter, it is only necessary to lift the body section 20 upwardly, so as to free the projections 38 from the slots 37, and to lift the flange 23 out of the base 16. The body may now be swung outwardly, as shown in Fig. 2, and then be drawn downwardly free from the upper section 11 of the spout. The base 16 may now be lifted upwardly and drawn outwardly to free the base section from the wall 10 and also from the lower spout section 12. To gain access to the body 20, it is only necessary to slide the cover 31 forwardly to disengage the same from the flanges 34 and admit of the lifting of the cover away from the body. The spreader plate 28 may now be removed by grasping the inturned flange 30 and lifting the plate out from the pins 29. Should leaves, or other foreign refuse, be carried down the rain spout 11, the spreader plate 28 collects and holds the leaves and prevents their passage down through the relatively small openings 39. Thus, the filter is prevented from becoming clogged and the larger particles taken up by the rain-water may be easily and quickly removed.

When the filter is removed for packing the same away during the winter months, the upper section 11 of the rain spout may be provided with an outwardly extending elbow 40 adapted to direct the rain-water outwardly from the wall. The lower section 12 of the rain spout is preferably closed by means of a cap 41 to prevent access of water or other material down through the conducting pipe 13. By operating the handle 15, the filtered water may be discharged from the nozzle 14 into a receptacle, or the like, placed therebeneath when it is desired to obtain filtered water for outside use.

What is claimed is:—

1. The combination with a rain spout, and a conducting pipe spaced therebeneath, of a basin having a depending nipple in its bottom adapted to fit into the upper end of the conducting pipe, and a filter section having an opening in its top adapted to slidably receive the lower end of the rain spout when said top is tilted inwardly beneath the spout, the filter section being adapted to be raised upon the spout and swung inwardly at its lower end and fitted thereat upon the basin.

2. In combination with a wall having thereon a rain spout and a conducting pipe spaced beneath the spout, of a basin having a depending nipple in its bottom adapted to fit into the upper end of the conducting pipe, a filter section having an opening in its top adapted to slidably receive the lower end of the rain spout when said top is tilted inwardly beneath the spout, the filter section being adapted to be raised upon the spout and swung inwardly at its lower end and to be seated upon the basin, and supporting means on the wall adapted to interlock with both the basin and the filter section by the positioning of the same, to support the filter independently of the spout and the pipe.

3. In a rain-water filter, the combination with a downwardly opening rain spout and an upwardly opening conducting pipe spaced therebeneath, of an upper filter section having an inlet in its top to receive the lower end of the rain spout and having a marginal flange upon its lower end, a lower section having an outlet in its bottom for engagement with said conducting pipe, a slip joint fastening means between each section and the wall supporting the spout and conducting pipe, said filter sections being adapted to be brought against said wall and into registry with the spout and conducting pipe respectively, and adapted to be slid into interfitting engagement to interlock said slip joint fastening means and secure the sections in place.

4. In a rain-water filter, a body, a horizontal partition in the upper end of the body, a filter element in said body between the bottom thereof and the partition, a spreading plate fitting transversely in the body in the space above the partition and having spaced apart openings therethrough to distribute the rain-water over the entire surface of the partition, said body being perforated above the bottom of the said plate and at the ends thereof, and a cover on the body having an opening therein to receive the end of a rain spout.

5. In a rain-water filter, a body having a foraminous bottom, filtering material in the body supported on the bottom, a foraminous partition in the body at the top of the filtering material to hold the same in place, a space being provided in the body above said partition, a V-shaped spreading plate supported in said space above the partition and extending transversely across said body, said spreading plate having spaced apart relatively small openings therethrough to distribute water in small streams over the entire surface of the partition, and a cover fitted to the top of the body above the spreading plate.

6. In a rain-water filter, a body having a foraminous bottom, filtering material in the body supported on the bottom, a foraminous partition in the body at the top of the filtering material to hold the same in place, and a V-shaped spreading plate supported in the body above the partition and having spaced apart relatively small openings therethrough to distribute water in small streams over the entire surface of the partition, the body having an inlet in its top over one of the inclined sides of the spreading plate to deliver the water thereto, the spreading plate having an inturned deflecting flange at the upper edge of its opposite inclined sides to deflect the flashing water downwardly into the spreading plate.

7. In a rain-water filter, a body, filtering material supported in the lower part of the body, a V-shaped spreading plate detachably fitted in the upper end of the body and having an inturned flange at one of its upper edges, and a detachable cover mounted on the body and provided with an inlet opening near one edge to deliver water therethrough upon one of the inclined sides of said spreading plate, said flange being adapted to deflect the flashing water into the bottom of the spreading plate, and said spreading plate being provided with a plurality of openings therein to deliver the water in a plurality of streams over the entire upper surface of the filtering material.

8. A rain-water filter comprising a hollow base section having a depending nipple adapted to connect with a conducting pipe and having a pair of upwardly tapering slots in its rear side, headed projections outstanding from the wall behind said conducting pipe in registry with said slots, an upper filter section, said filter section having a slidable cover with an opening to receive the lower end of a rain spout, and upwardly tapering slots in the rear wall of the filter section, the latter being adapted to be inserted beneath and raised about said rain spout, and headed projections outstanding from the wall opposite the slots of said filter section, said filter section further being adapted to be slid downwardly against the wall to bind its slots upon the registering headed projections and seat the filter section upon the base section, the base section being adapted to hold the filter section in engagement about said rain spout.

In testimony that I claim the foregoing as my own, I have hereto affixed my signature in the presence of two witnesses.

PHILIP BERNARD.

Witnesses:
MABLE ARME,
ESTHER ANDERSON.

Copies of this patent may be obtained for five cents each, by addressing the "Commissioner of Patents, Washington, D. C."